United States Patent
Itoh

(10) Patent No.: US 8,857,161 B2
(45) Date of Patent: Oct. 14, 2014

(54) EXHAUST GAS PURIFICATION APPARATUS AND EXHAUST GAS PURIFICATION METHOD FOR AN INTERNAL COMBUSTION ENGINE

(75) Inventor: Kazuhiro Itoh, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 39 days.

(21) Appl. No.: 13/394,631

(22) PCT Filed: Sep. 16, 2009

(86) PCT No.: PCT/JP2009/066155
§ 371 (c)(1),
(2), (4) Date: Mar. 7, 2012

(87) PCT Pub. No.: WO2011/033620
PCT Pub. Date: Mar. 24, 2011

(65) Prior Publication Data
US 2012/0174562 A1    Jul. 12, 2012

(51) Int. Cl.
| | |
|---|---|
| *F01N 3/00* | (2006.01) |
| *F01N 3/02* | (2006.01) |
| *F01N 3/08* | (2006.01) |
| *F01N 3/20* | (2006.01) |
| *F01N 13/00* | (2010.01) |
| *F01N 11/00* | (2006.01) |

(52) U.S. Cl.
CPC ......... *F01N 11/00* (2013.01); *F01N 2900/0416* (2013.01); *F01N 3/208* (2013.01); *F01N 2610/02* (2013.01); *F01N 2900/0601* (2013.01); *F01N 2560/026* (2013.01); *F01N 13/0097* (2014.06); *F01N 2900/1404* (2013.01); *F01N 2560/06* (2013.01); *Y02T 10/24* (2013.01); *F01N 2900/1402* (2013.01); *Y02T 10/47* (2013.01)

USPC ................... 60/295; 60/274; 60/277; 60/286; 60/299; 60/301

(58) Field of Classification Search
USPC ...................... 60/286, 295, 277, 299
See application file for complete search history.

(56) References Cited

U.S. PATENT DOCUMENTS

| 8,161,730 B2 * | 4/2012 | Chi et al. ................. 60/286 |
| 2006/0107653 A1 * | 5/2006 | Nakatani ................. 60/286 |

(Continued)

FOREIGN PATENT DOCUMENTS

| JP | A-2004-092608 | 3/2004 |
| JP | A-2007-170383 | 7/2007 |

(Continued)

OTHER PUBLICATIONS

International Search Report issued in International Patent Application No. PCT/JP2009/066155 dated Nov. 24, 2009.

*Primary Examiner* — Jesse Bogue
*Assistant Examiner* — Dapinder Singh
(74) *Attorney, Agent, or Firm* — Oliff PLC

(57) ABSTRACT

A detection unit that is arranged in an exhaust passage of an internal combustion engine configured to detect a state of the exhaust gas, addition unit configured to add the additive agent into the exhaust passage, a catalyst that is arranged at the downstream side of the detection unit and the addition unit so as to receive a supply of the additive agent from the addition unit, determination unit configured to determine whether detection accuracy of the detection unit drops due to the additive agent to be added from the addition unit, and stop unit configured to stop detection of the state of the exhaust gas by the detection unit in cases where it is determined by the determination unit that the detection accuracy of the detection unit drops.

8 Claims, 4 Drawing Sheets

(56) References Cited

U.S. PATENT DOCUMENTS

| | | |
|---|---|---|
| 2006/0112681 A1* | 6/2006 | Nakayama et al. ............ 60/286 |
| 2007/0144151 A1* | 6/2007 | Lueders et al. ................ 60/286 |
| 2009/0019837 A1 | 1/2009 | Suzuki et al. |
| 2009/0049824 A1* | 2/2009 | Kojima et al. ................. 60/285 |
| 2009/0126347 A1* | 5/2009 | Gabe et al. ..................... 60/285 |
| 2009/0223208 A1* | 9/2009 | Kojima et al. ................. 60/286 |
| 2009/0277159 A1* | 11/2009 | Driscoll et al. ............... 60/286 |
| 2010/0115918 A1 | 5/2010 | Sawada et al. |
| 2011/0041480 A1* | 2/2011 | Yasui et al. .................... 60/286 |
| 2011/0083424 A1* | 4/2011 | Wang et al. .................... 60/277 |

FOREIGN PATENT DOCUMENTS

| | | |
|---|---|---|
| JP | A-2008-163856 | 7/2008 |
| JP | A-2008-223681 | 9/2008 |
| JP | A-2009-024628 | 2/2009 |
| JP | A-2009-121413 | 6/2009 |
| JP | A-2009-127497 | 6/2009 |

* cited by examiner

EXHAUST GAS PURIFICATION APPARATUS AND EXHAUST GAS PURIFICATION METHOD FOR AN INTERNAL COMBUSTION ENGINE

TECHNICAL FIELD

The present invention relates to an exhaust gas purification apparatus and an exhaust gas purification method for an internal combustion engine.

BACKGROUND ART

There has been known a technique in which an NOx sensor, a reducing agent supply device, and an NOx selective reduction catalyst are arranged in an exhaust passage of an internal combustion engine in a sequential manner from an upstream side thereof to a downstream side thereof (for example, see a first patent document).

Here, even if the NOx sensor is arranged at the upstream side of the reducing agent supply device, there is a fear that urea water as a reducing agent supplied from the reducing agent supply device may flow backwards to the vicinity of the NOx sensor due to the pulsation of exhaust gas, etc. When ammonia ($NH_3$) derived from urea adheres to the NOx sensor or exists in the vicinity of the NOx sensor, the ammonia may be detected by the NOx sensor, similar to NOx. On the other hand, the ammonia adhered to the NOx sensor may reduce NOx, thereby decreasing the concentration of NOx. If doing so, it will become difficult to detect the concentration of NOx in the exhaust gas in an accurate manner.

In addition, in cases where a temperature sensor is provided, if a liquid reducing agent is adhered to the temperature sensor or exists in the vicinity of the temperature sensor, heat in the surroundings of the temperature sensor is taken up by the reducing agent upon evaporation thereof, so it becomes difficult to detect the temperature of the exhaust gas in an accurate manner.

Further, in cases where a catalyst using HC as a reducing agent is provided, when the HC is added from the reducing agent supply device, it becomes difficult due to detect the air fuel ratio of the exhaust gas in an accurate manner due to the HC thus added.

The additive added in the exhaust gas adheres to a sensor in this manner, or there is a fear in the vicinity of a sensor that an error may occur in the detected value of the said sensor when it exists.

PRIOR ART REFERENCES

Patent Documents

First Patent Document: Japanese patent application laid-open No. 2007-170383
Second Patent Document: Japanese patent application laid-open No. 2009-121413
Third Patent Document: Japanese patent application laid-open No. 2009-024628

SUMMARY OF THE INVENTION

Problems to be Solved by the Invention

The present invention is made in view of the problems as mentioned above, and has for its object to provide a technique of suppressing the occurrence of an error in a detected value of a sensor due to an additive agent to be added into an exhaust gas.

Means for Solving the Problems

In order to achieve the above-mentioned object, an exhaust gas purification apparatus for an internal combustion engine according to the present invention adopts the following units.

That is, the exhaust gas purification apparatus for an internal combustion engine according to the present invention is comprising:

detection unit that is arranged in an exhaust passage of the internal combustion engine configured to detect a state of an exhaust gas;

addition unit configured to add an additive agent into said exhaust passage;

a catalyst that is arranged at the downstream side of said detection unit and said addition unit so as to receive a supply of the additive agent from said addition unit;

determination unit configured to determine whether detection accuracy of said detection unit drops due to the additive agent to be added from said addition unit; and stop unit configured to stop the detection of the state of the exhaust gas by said detection unit in cases where it is determined by said determination unit that the detection accuracy of said detection unit drops.

The detection unit may be a sensor that detects a state of the exhaust gas, or may be a sensor that detects a concentration of a specific component in the exhaust gas. The addition unit adds a reducing agent or an oxidizing agent as the additive agent. Then, this additive agent reacts in the catalyst arranged at the downstream side. By receiving a supply of the additive agent, the catalyst purifies the exhaust gas, or raises the temperature of the exhaust gas, or recovers its purification ability, for example.

Here, if the additive agent added from the addition unit adheres to the detection unit or exists in the vicinity of the detection unit, the detection unit will be affected by the influence of an the additive agent, as a result of which there will be a fear that the detection accuracy of the detection unit may drop. In such a case, the stop unit serves to stop the detection of the state of the exhaust gas by the detection unit. Thus, it is possible to suppress the occurrence of an error in a detected value of the detection unit. On the other hand, in cases where the detection unit is not affected by the influence of the additive agent, there will be no error in the detected value of the detection unit. For this reason, the detection accuracy of the detection unit does not drop, so the detection of the state of the exhaust gas by the detection unit is permitted.

Then, when the additive agent is added by said addition unit, said determination unit can make a determination that the detection accuracy of said detection unit drops. This makes a determination that the detection accuracy drops or becomes lower as compared with the case in which the additive agent is not added by the addition unit.

Here, when the additive agent is added by the addition unit, there is a fear that the additive agent may flow toward the detection unit. Even if the detection unit is arranged at the upstream side of the addition unit, the additive agent may flow toward the detection unit due to the pulsation of the exhaust gas. If this additive agent adheres to the detection unit or exists in the vicinity of the detection unit, there will be a fear that the accuracy of the detection unit may drop. In such a case, if it is determined that the accuracy of the detection unit drops and the detection of the state of the exhaust gas is stopped, it will be possible to suppress the occurrence of an error in the detected value of the detection unit.

Here, note that the longer a distance between the addition unit and the detection unit, the longer becomes a period of time until the additive agent added from the addition unit reaches the detection unit. Accordingly, the time or timing at which the detection accuracy of the detection unit drops deviates or lags by this period of time. Thus, the timing at which the detection of the state of the exhaust gas is stopped may be decided according to a period of time after the additive agent is added until it reaches the detection unit. Because this period of time is affected by the influence of the distance between the addition unit and the detection unit and the flow speed of the exhaust gas, for example, the timing to stop the detection of the state of the exhaust gas may be decided based on these factors. In this case, the determination unit makes a determination that the detection accuracy of the detection unit drops in a period of time which lags by a period of time taken until the additive agent moves from the addition unit to the detection unit, with respect to the period of time in which the additive agent is added from the addition unit.

In addition, the more the amount of the additive agent adhering to the detection unit, the longer becomes a period of time until all the additive agent evaporates. Accordingly, the timing at which the detection accuracy of the detection unit drops deviates or lags by this period of time. Thus, the time or timing at which the detection of the state of the exhaust gas is stopped may be decided according to a period of time after the additive agent adheres to the detection unit until it all evaporates. Because this period of time is affected by the influence of the timing of the additive agent and the amount of supply thereof, for example, the timing to stop the detection of the state of the exhaust gas may be decided based on these factors. In this case, the determination unit makes a determination that the detection accuracy of the detection unit drops in a period of time which is a sum of the period of time in which the additive agent is added from the addition unit and the period of time until all the additive agent evaporates. In addition, the above-mentioned time lag may also be taken into consideration.

Moreover, provision can be made for estimation unit configured to estimate the state of the exhaust gas of the internal combustion engine based on an operating state of the internal combustion engine, wherein in cases where the detection of the state of the exhaust gas by said detection unit is stopped by said stop unit, the state of the exhaust gas can be estimated by said estimation unit, instead of the detection of the state of the exhaust gas by said detection unit.

If doing so, even when the detection of the state of the exhaust gas by the detection unit is stopped, the state of the exhaust gas can be obtained by the provision of the estimation unit. For example, in cases where the amount of addition of the additive agent is decided according to the state of the exhaust gas, the amount of addition of the additive agent can be decided according to an estimated value thereof, even during the time when the additive agent is being supplied. Here, note that the state of the exhaust gas changes, for example, according to the operating state of the internal combustion engine, so it is possible to estimate the state of the exhaust gas based on the operating state of the internal combustion engine.

In addition, said catalyst may be composed to include an NOx selective reduction catalyst that serves to reduce the exhaust gas in a selective manner, and said detection unit may be composed to include an NOx sensor that detects a concentration of NOx in the exhaust gas, and said addition unit may add the reducing agent which is derived from ammonia.

In cases where the NOx sensor is adopted as the detection unit, there is a fear that an error may occur in the detected value due to the detection of ammonia. On the other hand, in cases where a determination is made that the detection accuracy of the NOx sensor drops, if the detection of the concentration of NOx by the NOx sensor is stopped, it is possible to suppress the occurrence of an error in the detected value of the NOx sensor. Urea can be contained in the reducing agent.

Moreover, said detection unit may be composed to include a temperature sensor that detects the temperature of the exhaust gas.

In cases where the temperature sensor is adopted as the detection unit, the additive agent takes heat from the exhaust gas or the temperature sensor, so there will be a fear that an error may be caused in the detected value of the temperature sensor. On the other hand, in cases where a determination is made that the detection accuracy of the temperature sensor drops, if the detection of the temperature of the exhaust gas by the temperature sensor is stopped, it is possible to suppress the occurrence of an error in the detected value of the temperature sensor.

In order to achieve the above-mentioned object, an exhaust gas purification method for an internal combustion engine according to the present invention adopts the following means. That is, the exhaust gas purification method for an internal combustion engine according to the present invention is comprising:

a first step to determine whether detection accuracy of a state of an exhaust gas drops due to the existence of an additive agent to be added to a catalyst at the time when the state of the exhaust gas of the internal combustion engine is detected; and a second step to stop the detection of the state of the exhaust gas in cases where it is determined that the detection accuracy of the state of the exhaust gas drops.

Here, note that in said first step, when the additive agent is added, a determination can be made that the detection accuracy of the state of the exhaust gas drops.

In addition, the method may comprise including a third step to estimate the state of the exhaust gas, instead of the detection of the state of the exhaust gas, in cases where the detection of the state of the exhaust gas is stopped in said second step.

Effect of the Invention

According to the present invention, it is possible to suppress the occurrence of an error in a measured value of a sensor due to an additive agent added into exhaust gas.

MODES FOR CARRYING OUT THE INVENTION

Hereinafter, reference will be made to specific modes of embodiments of an exhaust gas purification apparatus and an exhaust gas purification method for an internal combustion engine according to the present invention based on the attached drawings.

First Embodiment

Figure 1:
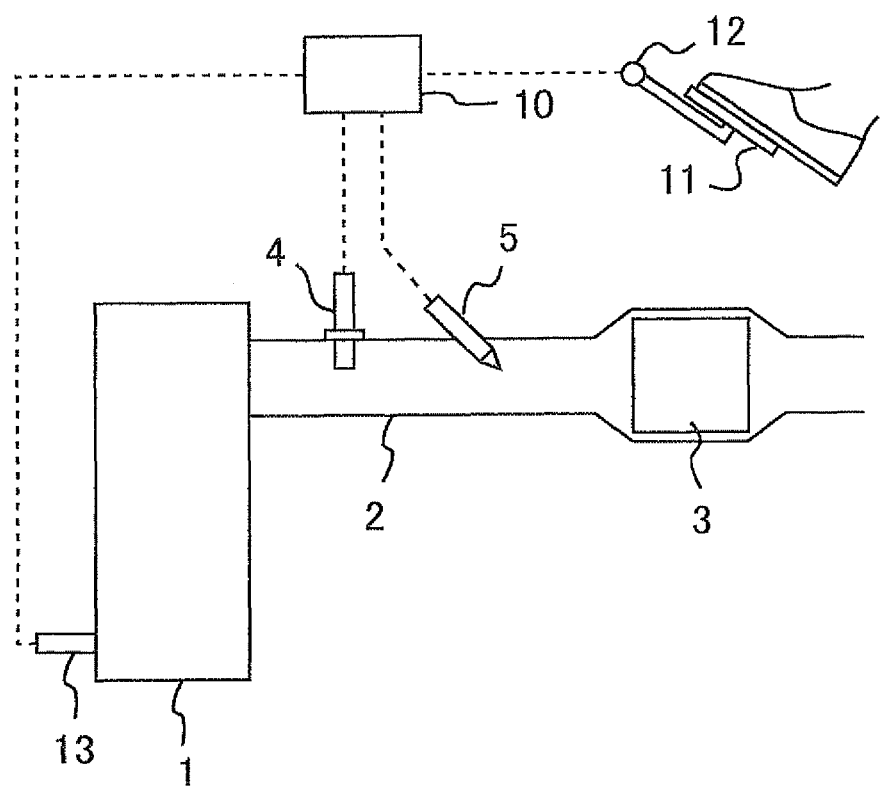
FIG. 1 is a view showing the schematic construction of an exhaust gas purification apparatus for an internal combustion engine according to a first and a second embodiment of the present invention.

FIG. 1 is a view showing the schematic construction of an exhaust gas purification apparatus for an internal combustion engine according to this first embodiment of the present invention. An internal combustion engine 1 shown in FIG. 1 is a four-cycle diesel engine of a water cooled type having four cylinders. Here, note that the following embodiments can be applied even to a gasoline engine in a similar manner.

An exhaust passage 2 is connected to the internal combustion engine 1. In the exhaust passage 2, there are arranged a sensor 4, an addition valve 5, and a catalyst 3 in a sequential manner from an upstream side in the direction of flow of an exhaust gas.

In addition, the sensor 4 is to detect a state of the exhaust gas, and it detects, for example, a concentration of a specific component in the exhaust gas. As the sensor 4, there can be mentioned, for example, an air fuel ratio sensor, an oxygen concentration sensor, an HC sensor, or an NOx sensor. In addition, the sensor 4 may be, for example, a temperature sensor that detects a temperature of the exhaust gas. Here, note that in this embodiment, the sensor 4 corresponds to detection unit in the present invention.

The addition valve 5 injects an additive agent such as a reducing agent, an oxidizing agent or the like. For the additive agent, there can be used, for example, fuel (HC), or a reducing agent derived from ammonia, such as urea water, or the like. What is used for the additive agent is decided according to the kind of catalyst 3. Then, the additive agent reacts in the catalyst 3. Here, note that in this embodiment, the addition valve 5 corresponds to addition unit in the present invention.

As the catalyst 3, there can be mentioned, for example, an NOx storage reduction catalyst, an NOx selective reduction catalyst, an oxidation catalyst, or a three-way catalyst. In addition, a particulate filter may be provided in which these catalysts are supported, or are arranged at a location upstream thereof.

In the internal combustion engine 1 constructed as stated above, there is arranged in combination therewith an ECU 10 which is an electronic control unit for controlling the internal combustion engine 1. This ECU 10 is a unit that controls the operating state of the internal combustion engine 1 in accordance with the operating conditions of the internal combustion engine 1 and/or driver's requirements.

The above-mentioned sensors, an accelerator opening sensor 12, which is able to detect an engine load by outputting an electrical signal corresponding to an amount by which a driver depressed an accelerator pedal 11, and a crank position sensor 13, which detects the number of revolutions per unit time of the engine, are connected to the ECU 10 through electrical wiring, and the output signals of these variety of kinds of sensors are inputted to the ECU 10. On the other hand, the addition valve 5 is connected to the ECU 10 through electrical wiring, so that the addition valve 5 is controlled by the ECU 10.

Here, note that in this embodiment, description will be made on the following assumptions. The sensor 4 is an NOx sensor; the addition valve 5 is to add urea water; and the catalyst 3 is an NOx selective reduction catalyst. According to such assumptions, the urea water added from the addition valve 5 is hydrolyzed by the heat of the exhaust gas, as a result of which ammonia ($NH_3$) is produced, and a part or all thereof adsorbs to the catalyst 3. This ammonia serves to reduce NOx in a selective manner. Then, by supplying the ammonia to the catalyst 3 or by making it to be adsorbed thereto beforehand, NOx is made to be reduced during the time when the NOx passes through the catalyst 3.

Then, in order to make ammonia to be adsorbed to the catalyst 3 beforehand, urea water is added from the addition valve 5 in an intermittent manner. For example, the concentration of NOx is detected by the sensor 4, and the amount of NOx is calculated from the NOx concentration thus detected and the amount of intake air. The amount of ammonia adsorbed to the catalyst 3 decreases according to this amount of NOx, so the urea water is added from the addition valve 5 at the time when the amount of ammonia adsorbed to the catalyst 3 becomes equal to or less than a prescribed amount. Here, note that the interval at which the urea water is added from the addition valve 5 may be set to a constant value, and the amount of the urea water to be added from the addition valve 5 may be decided according to the NOx concentration obtained by the sensor 4. In this manner, the urea water is added intermittently.

Here, there is a fear that the urea water added into the exhaust gas from the addition valve 5 may flow backwards up to the vicinity of the sensor 4 due to the pulsation of the exhaust gas. In the case of the NOx sensor, ammonia as well as NOx may be detected by a catalyst coated on the NOx sensor, and hence, if ammonia exists in the areas surrounding the NOx sensor, there will be a fear that the concentration of NOx may be detected to be higher than an actual value thereof. On the other hand, if the urea water adheres to the sensor 4, the NOx in the exhaust gas may be reduced by means of the catalyst coated on the sensor 4, so there will be a fear that the concentration of NOx may be detected to be lower than the actual value thereof. In this manner, an error may occur in the detected value of the sensor 4 due to the addition of the urea water. In contrast to this, in this embodiment, at the time when urea water is added into the exhaust gas from the addition valve 5, the detection of the concentration of NOx by the sensor 4 is stopped.

Figure 2:
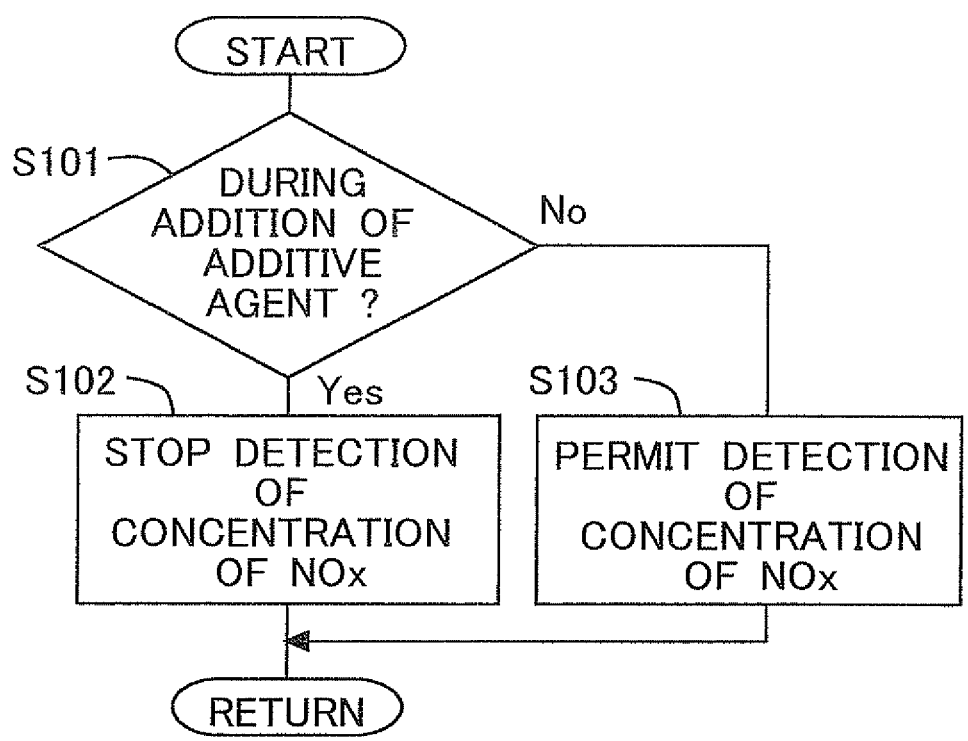
FIG. 2 is a flow chart showing a control flow according to the first embodiment.

FIG. 2 is a flow chart showing a control flow or routine according to this first embodiment. This routine is carried out by means of the ECU 10 in a repeated manner at each predetermined time interval.

In step S101, it is determined whether urea water is added from the addition valve 5. That is, it is determined whether the sensor 4 is in a state where there is a fear that an error may occur in the detected value of the sensor 4. In cases where an affirmative determination is made in step S101, the routine advances to step S102, whereas in cases where a negative determination is made, the routine advances to step S103. Here, note that in this embodiment, the ECU 10, which carries out the processing of step S101, corresponds to determination unit in the present invention. Also, in this embodiment, the step S101 corresponds to a first step in the present invention.

In step S102, the detection of the concentration of NOx by the sensor 4 is stopped. On the other hand, in step S103, the detection of the concentration of NOx by the sensor 4 is permitted. Here, note that in this embodiment, the ECU 10, which carries out the processing of step S102, corresponds to stop unit in the present invention. Also, in this embodiment, the step S102 corresponds to a second step in the present invention.

In this manner, when urea water is added from the addition valve 5, the detection of the concentration of NOx by the sensor 4 is stopped, whereas when urea water is not added, the detection of the concentration of NOx by the sensor 4 is permitted.

Here, note that in this embodiment, the detection of the concentration of NOx by the sensor 4 is stopped in a period of time in which urea water is added from the addition valve 5, but instead of this, the detection of the concentration of NOx by the sensor 4 may be stopped in a period of time in which the urea water is actually adhered to the sensor 4, or in a period of time in which the urea water actually exists in the areas surrounding the sensor 4. That is, the time taken until the urea water added from the addition valve 5 reaches the sensor 4 may be taken into consideration, or the time taken until the urea water adhered to the addition valve 5 evaporates may be taken into consideration. These periods of time have correlation with, for example, the amount of addition of urea water, the timing or time of addition of urea water, the flow rate of the exhaust gas, and the distance from the addition valve 5 to the sensor 4, and hence can be obtained based on the values of these factors. Such correlation may have beforehand been obtained through experiments, etc., made into a map, and stored in the ECU 10.

Here, note that in this embodiment, the detection of the concentration of NOx by the sensor 4 may be stopped, for example, at the time when the flow speed of the exhaust gas is equal to or less than a specified value and in the period of time in which urea water is added from the addition valve 5. In this case, when the flow speed of the exhaust gas exceeds the specified value, the detection of the concentration of NOx by the sensor 4 is permitted even in the period of time in which urea water is added from the addition valve 5. Here, the higher the flow speed of the exhaust gas, the more difficult it becomes for the urea water to adhere to the sensor 4. In addition, the higher the flow speed of the exhaust gas, the more difficult it becomes for the urea water to flow backwards. Then, even if urea water is added, the detected value of the sensor 4 may not be affected, depending on the flow speed of the exhaust gas. In such a case, it is possible to permit the detection of the concentration of NOx even at the time of adding urea water. As a result of this, it is possible to suppress the detection of the concentration of NOx from being stopped even when it is unnecessary. The specified value has been beforehand obtained as a flow speed at which urea water does not adhere to the sensor 4 or does not exist in the vicinity of the sensor 4. Here, note that the flow rate of the exhaust gas or the space velocity (SV) thereof may be used in place of the flow speed of the exhaust gas.

Here, note that in the case where the sensor 4 is a temperature sensor, heat is taken from the exhaust gas and the sensor 4 at the time when the additive agent added from the addition valve 5 evaporates, so the temperature of the exhaust gas and the temperature of the sensor 4 are caused to decrease. If temperature detection is made by the sensor 4 at this time, a temperature lower than the original or actual temperature of the exhaust gas will be detected. On the other hand, if the detection of the temperature of the exhaust gas by the sensor 4 is stopped when the additive agent is added from the addition valve 5, it is possible to suppress the occurrence of an error in the detected value of the temperature of the exhaust gas.

In addition, in cases where the sensor 4 is an air fuel ratio sensor and the additive agent is HC, the HC added from the addition valve 5 affects the detected value of the air fuel ratio sensor. On the other hand, if the detection of the air fuel ratio by the air fuel ratio sensor is stopped when HC is added from the addition valve 5, it is possible to suppress the occurrence of an error in the detected value of the air fuel ratio. If doing so, the amount of addition of HC can be rationalized, so it is possible to suppress the catalyst 3 from being poisoned and overheated by HC. Moreover, it is also possible to suppress the generation of hydrogen sulfide due to the air fuel ratio becoming excessively low.

Here, note that in this embodiment, the addition valve 5 is arranged at the downstream side of the sensor 4 in the direction of flow of the exhaust gas, but instead of this, even in cases where the addition valve 5 is arranged at the upstream side of the sensor 4, the present invention can be applied in a similar manner. In addition, the addition valve 5 may also be arranged at a position which has no difference from that of the sensor 4 in the direction of flow of the exhaust gas.

As described above, according to this embodiment, when the additive agent is added from the addition valve 5, the detection of the state of the exhaust gas by the sensor 4 is stopped, so it is possible to suppress the occurrence of an error in the detected value of the sensor 4. Accordingly, an appropriate amount of additive agent can be added, and hence, it is possible to suppress a drop in exhaust gas purification performance due to a shortage of the additive agent. In addition, the additive agent becomes surplus or excessive, thereby making it possible to suppress the additive agent from passing sideways through the catalyst 3.

Second Embodiment

In this second embodiment, when the additive agent is added from the addition valve 5, the detection of the state of the exhaust gas by the sensor 4 is stopped, and at the same time, the state of the exhaust gas is estimated from the operating state of the internal combustion engine 1, and the thus estimated value is used instead of the detected value obtained by the sensor 4. The other devices, parts and so on are the same as those in the first embodiment, so the explanation thereof is omitted.

When the additive agent is added from the addition valve 5, the detection of the state of the exhaust gas by the sensor 4 is stopped. This is carried out in the same manner as in the first embodiment, so an explanation thereof is omitted. Then, the state of the exhaust gas is estimated in the following manner. Here, note that what is to be estimated at this time is the same as that to be detected by the sensor 4.

Here, the state of the exhaust gas is affected, for example, by the influences of the number of engine revolutions per unit time, the degree of opening of the accelerator pedal, the amount of fuel injection, fuel injection timing, the throttle opening degree, the intake air temperature, the amount of intake air, the atmospheric pressure, and so on. In addition, in cases where provision is made for an EGR (Exhaust Gas Recirculation) system for supplying a part of the exhaust gas to the intake passage, the state of the exhaust gas is also affected by the influences of the degree of opening of an EGR valve which adjusts the flow rate of an EGR gas, and the temperature of an EGR cooler which carries out cooling of the EGR gas. Moreover, in cases where a turbocharger is provided, the state of the exhaust gas is further affected by the influences of the supercharging pressure and the number of revolutions per unit time of the turbocharger. In cases where a variable volume type turbocharger is provided, the state of the exhaust gas is affected by the influence of the degree of opening of nozzle banes thereof. Here, note that there are some ones which are not affected by any influence, depending on what is to be estimated.

That is, the state of the exhaust gas can be estimated based on those which have correlation with what is to be estimated, among these values. Such correlation may have beforehand been obtained through experiments, etc., and made into a map.

Figure 3:
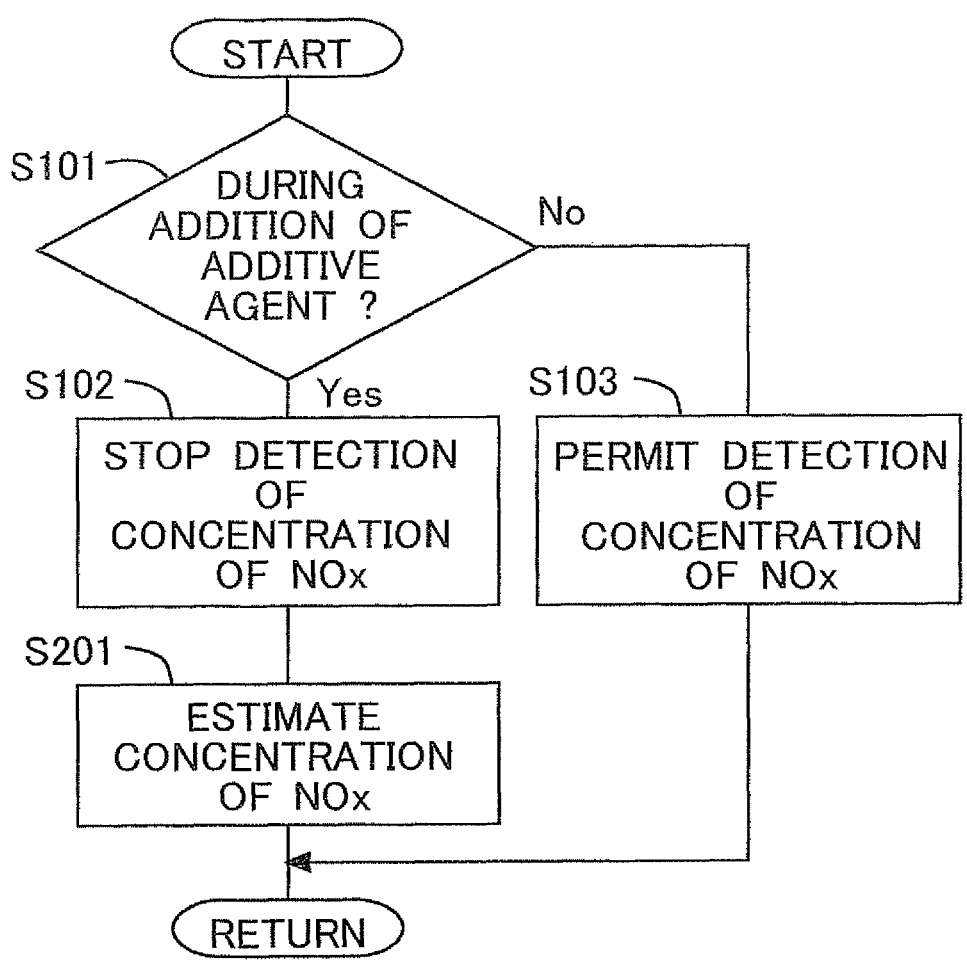
FIG. 3 is a flow chart showing a control flow according to the second embodiment.

FIG. 3 is a flow chart showing a control flow or routine according to this second embodiment. This routine is carried out by means of the ECU 10 in a repeated manner at each predetermined time interval. Here, note that description will be made on the following assumptions. The addition valve 5 is to add urea water, and the catalyst 3 is an NOx selective reduction catalyst. Also, note that for those steps in which the same processing as in the flow shown in FIG. 2 is carried out, the same symbols are attached and an explanation thereof is omitted. Then, in the flow shown in FIG. 3, in step S201, the concentration of NOx is estimated. If the amount of addition of urea water and the timing of addition thereof are decided based on the concentration of NOx estimated in this manner, an appropriate amount of additive agent can be added at an appropriate timing. Here, note that in this embodiment, the ECU 10, which carries out the processing of step S201, corresponds to estimation unit in the present invention. Also, in this embodiment, the step S201 corresponds to a third step in the present invention.

As described above, according to this second embodiment, when the additive agent is added from the addition valve 5, the detection of the state of the exhaust gas by the sensor 4 is stopped, so it is possible to suppress the occurrence of an error in the detected value of the sensor 4. Moreover, at this time, it is possible to obtain the state of the exhaust gas according to the estimation thereof. As a result of this, it is possible to attain the rationalization of the amount of addition and the timing of addition of the additive agent.

Third Embodiment

Figure 4:
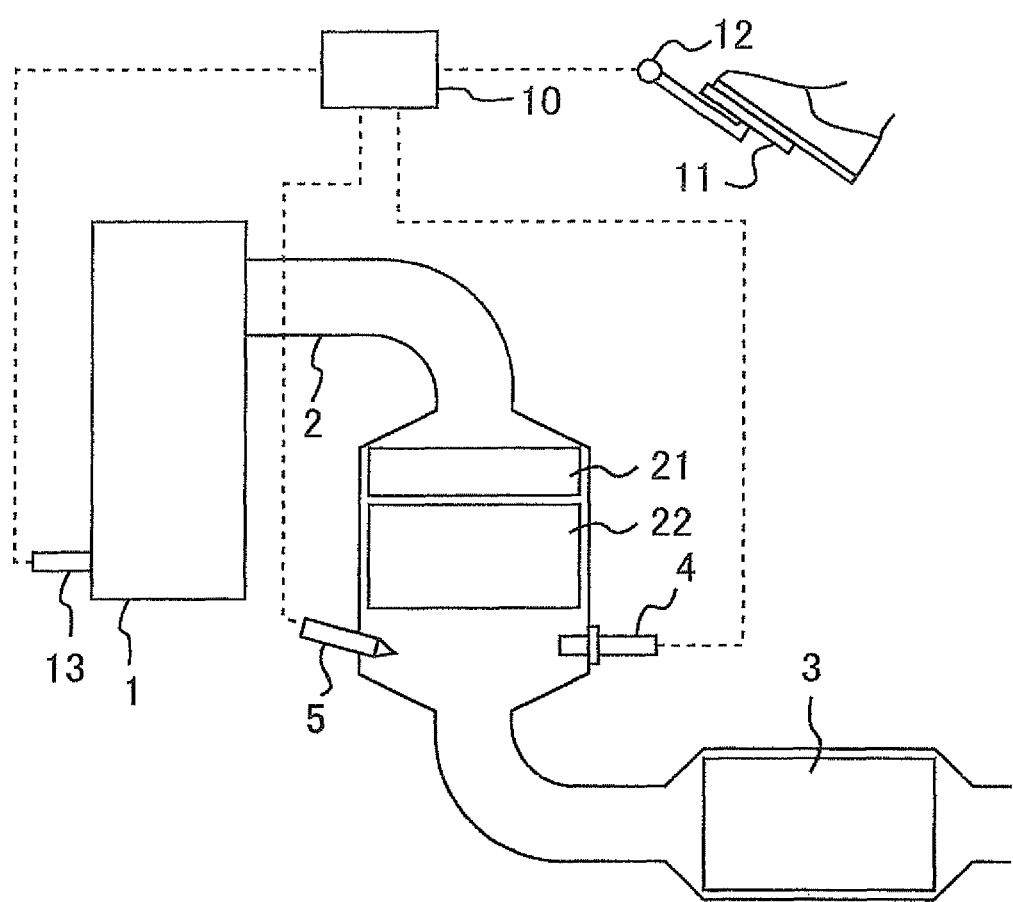
FIG. 4 is a view showing the schematic construction of an exhaust gas purification apparatus for an internal combustion engine according to a third embodiment of the present invention.

FIG. 4 is a view showing the schematic construction of an exhaust gas purification apparatus for an internal combustion engine according to this third embodiment of the present invention. Mainly, those which are different from FIG. 1 will be explained.

In this embodiment, an oxidation catalyst 21 and a particulate filter 22 (hereinafter referred to simply as a filter 22) are arranged in the exhaust passage 2 at the upstream side of the sensor 4 and the addition valve 5. The filter 22 traps PM (particulate matter) contained in the exhaust gas. Then, when the particulate matter trapped by the filter 22 is oxidized, the temperature of the filter 22 is caused to rise by supplying, for example, HC to the oxidation catalyst 21. Here, note that for the oxidation catalyst 21, there can be used another catalyst having an oxidation function, such as for example a three-way catalyst, an NOx storage reduction catalyst, etc. In addition, the oxidation catalyst 21 may be supported on the filter 22.

The addition valve 5 and the sensor 4 are mounted or arranged in the exhaust passage 2 at locations immediately downstream of the filter 22. The addition valve 5 is arranged at the downstream side of the sensor 4 in the direction of flow of the exhaust gas, or at a location that has no difference from (i.e., is identical with) that of the sensor 4 in the direction of flow of the exhaust gas. That is, the addition valve 5 is arranged at a location at which the sensor 4 is not positioned at the downstream side of the addition valve 5 in the direction of flow of the exhaust gas. In addition, the addition valve 5 and the sensor 4 are arranged at locations at which the channel cross sections of the exhaust passage 2 are made relatively large, so as to reduce a pressure loss in the filter 22.

With such an arrangement, the distance from the addition valve 5 to the catalyst 3 can be made long, and the channel cross sectional area of the exhaust passage 2 is decreased and increased, so that the additive agent can be dispersed in a wide range, as a result of which the concentration of the additive agent can be made uniform. According to this, the purification of the exhaust gas in the catalyst 3 can be facilitated.

However, the distance of the addition valve 5 and the sensor 4 becomes short, so that the sensor 4 becomes easy to be affected by the influence of the additive agent added from the addition valve 5.

On the other hand, similar to the first embodiment, when the additive agent is added from the addition valve 5, the detection of the state of the exhaust gas by means of the sensor 4 is stopped. In addition, similar to the second embodiment, when the additive agent is added from the addition valve 5, the detection of the state of the exhaust gas by the sensor 4 may be stopped, and at the same time, the state of the exhaust gas may be estimated from the operating state of the internal combustion engine 1. In this manner, it is possible to suppress the occurrence of an error in the detected value of the sensor 4, while enhancing the exhaust gas purification performance.

EXPLANATION OF REFERENCE NUMERALS AND CHARACTERS 1 internal combustion engine
2 exhaust passage
3 catalyst
4 sensor
5 addition valve
10 ECU
11 accelerator pedal
12 accelerator opening sensor
13 crank position sensor
21 oxidation catalyst
22 particulate filter

The invention claimed is:

1. An exhaust gas purification apparatus for an internal combustion engine comprising:
 $NO_x$ sensor that is arranged in an exhaust passage of the internal combustion engine and is configured to detect a concentration of $NO_x$ in an exhaust gas;
 an addition unit configured to add a reducing agent derived from ammonia as an additive agent into the exhaust passage;
 a catalyst that is arranged at a downstream side of the $NO_x$ sensor and the addition unit so as to receive a supply of the additive agent from the addition unit; and
 an electronic control unit having control logic that causes the electronic control unit to:
 determine whether detection accuracy of the $NO_x$ sensor drops due to the additive agent to be added from the addition unit; and
 stop the detection of the concentration of $NO_x$ in the exhaust gas by the $NO_x$ sensor in cases where it is determined by the electronic control unit that the detection accuracy of the $NO_x$ sensor drops.

2. The exhaust gas purification apparatus for an internal combustion engine as set forth in claim 1, wherein when the additive agent is added by the addition unit, the electronic control unit makes a determination that the detection accuracy of the $NO_x$ sensor drops.

3. The exhaust gas purification apparatus for an internal combustion engine as set forth in claim 1, wherein the electronic control unit estimates the concentration of $NO_x$ in the exhaust gas of the internal combustion engine based on an operating state of the internal combustion engine; and
 when the electronic control unit stops detection of the concentration of $NO_x$ in the exhaust gas by the $NO_x$ sensor, the concentration of $NO_x$ in the exhaust gas is estimated by the electronic control unit, instead of the detection of the concentration of $NO_x$ in the exhaust gas by the $NO_x$ sensor.

4. The exhaust gas purification apparatus for an internal combustion engine as set forth in claim 1, wherein
said catalyst includes $NO_x$ selective reduction catalyst that serves to reduce the concentration of $NO_x$ in the exhaust gas in a selective manner.

5. An exhaust gas purification method for an internal combustion engine, the method comprising:
a first step to add an additive agent to a catalyst, wherein the additive agent is a reducing agent derived from ammonia;
a second step to determine whether detection accuracy of a NOx sensor that detects a concentration of NOx in an exhaust gas drops due to the existence of the additive agent being added to the catalyst at the time at a time when the concentration of NOx in the exhaust gas of the internal combustion engine is detected; and
a third step to stop detection of the concentration of NOx in the exhaust gas in cases where it is determined that the detection accuracy of the concentration of NOx in the exhaust gas drops.

6. The exhaust gas purification method for an internal combustion engine as set forth in claim 5, wherein in the first step, when the additive agent is added, a determination is made that the detection accuracy of the concentration of $NO_x$ in the exhaust gas drops.

7. The exhaust gas purification method for an internal combustion engine as set forth in claim 5, further comprising:
a third step to estimate the concentration of $NO_x$ in the exhaust gas, instead of the detection of the concentration of $NO_x$ in the exhaust gas, in cases where the detection of the concentration of $NO_x$ in the exhaust gas is stopped in the second step.

8. An exhaust gas purification apparatus for an internal combustion engine comprising:
an air fuel ratio sensor that is arranged in an exhaust passage of the internal combustion engine and is configured to detect an air fuel ratio of an exhaust gas;
an addition unit configured to add HC as an additive agent into the exhaust passage;
a catalyst that is arranged at a downstream side of the air fuel ratio sensor and the addition unit so as to receive a supply of the additive agent from the addition unit; and
an electronic control unit having control logic that causes the electronic control unit to:
determine whether detection accuracy of the air fuel ratio sensor drops due to the additive agent to be added from the addition unit; and
stop the detection of the air fuel ratio of the exhaust gas by the air fuel ratio sensor in cases where it is determined by the electronic control unit that the detection accuracy of the air fuel ratio sensor drops.

\* \* \* \* \*